(12) United States Patent
Lin et al.

(10) Patent No.: US 9,423,507 B2
(45) Date of Patent: Aug. 23, 2016

(54) METHODS AND APPARATUSES FOR MULTIPATH ESTIMATION AND CORRECTION IN GNSS NAVIGATION SYSTEMS

(75) Inventors: Xiangdong Lin, Irvine, CA (US); David Allan Tuck, San Clemente, CA (US); Mangesh Chansarkar, Irvine, CA (US)

(73) Assignee: CSR TECHNOLOGY INC., Sunnyvale, CA (US)

( * ) Notice: Subject to any disclaimer, the term of this patent is extended or adjusted under 35 U.S.C. 154(b) by 665 days.

(21) Appl. No.: 13/484,217

(22) Filed: May 30, 2012

(65) Prior Publication Data

US 2013/0321202 A1    Dec. 5, 2013

(51) Int. Cl.
*G01S 19/42* (2010.01)
*G01S 19/22* (2010.01)
*G01S 19/40* (2010.01)

(52) U.S. Cl.
CPC .............. *G01S 19/428* (2013.01); *G01S 19/22* (2013.01); *G01S 19/40* (2013.01)

(58) Field of Classification Search
CPC ........ G01S 19/22; G01S 19/428; G01S 19/40
USPC ......................................... 342/357.61, 357.23
See application file for complete search history.

(56) References Cited

U.S. PATENT DOCUMENTS

| 5,726,659 | A | 3/1998 | Kee et al. |
| 6,693,592 | B2 * | 2/2004 | Dowdle et al. ................ 342/453 |
| 7,535,414 | B2 | 5/2009 | Han |
| 7,961,141 | B2 | 6/2011 | Dai et al. |
| 2003/0107513 | A1 | 6/2003 | Abraham et al. |
| 2004/0203853 | A1 * | 10/2004 | Sheynblat ................ 455/456.1 |
| 2005/0225483 | A1 | 10/2005 | Abraham et al. |
| 2008/0082266 | A1 * | 4/2008 | Bye et al. ...................... 701/214 |
| 2008/0309553 | A1 * | 12/2008 | Chansarkar et al. ...... 342/357.15 |
| 2009/0009386 | A1 | 1/2009 | Van Diggelen |
| 2010/0164788 | A1 | 7/2010 | Ghaida et al. |
| 2012/0062426 | A1 | 3/2012 | Tocker |

(Continued)

FOREIGN PATENT DOCUMENTS

| EP | 2626724 | 8/2013 |
| GB | 2462926 | 3/2010 |

(Continued)

OTHER PUBLICATIONS

International Search Report issued Jan. 24, 2011 in corresponding PCT/GB10/051460.

(Continued)

*Primary Examiner* — Cassie Galt
(74) *Attorney, Agent, or Firm* — The Marbury Law Group, PLLC (57) ABSTRACT

The present invention relates generally to methods and apparatuses for estimating and correcting for multipath in GNSS navigation systems. According to some aspects, the invention operates in situations where position and estimated position error are reasonably stable so as to detect when large multipath errors are present with confidence. After detection, the slowly varying biases from multipath or other un-modeled sources can be modeled separately from the navigation state. The measurements are kept in the solution without biasing the navigation state thereby ignoring the long-term biases for use over short-term periods with minimized pseudorange error when necessary.

10 Claims, 5 Drawing Sheets

(56) References Cited

U.S. PATENT DOCUMENTS

| | | |
|---|---|---|
| 2012/0127029 A1* | 5/2012 | Rachlin et al. .......... 342/357.23 |
| 2012/0182179 A1* | 7/2012 | Bamberger ............ G01S 19/40 342/357.23 |
| 2013/0002479 A1* | 1/2013 | Pratt et al. ............... 342/357.25 |

FOREIGN PATENT DOCUMENTS

| | | |
|---|---|---|
| GB | 2500971 | 10/2013 |
| WO | 00/45191 | 8/2000 |
| WO | 02/052225 | 7/2002 |
| WO | 03/038469 | 5/2003 |
| WO | 2004/038447 | 5/2004 |
| WO | 2006/128298 | 12/2006 |

OTHER PUBLICATIONS

Further Search Report issued Jan. 20, 2014 in corresponding British application GB1307920.7.

* cited by examiner

METHODS AND APPARATUSES FOR MULTIPATH ESTIMATION AND CORRECTION IN GNSS NAVIGATION SYSTEMS

FIELD OF THE INVENTION

The present invention relates generally to GNSS navigation and more particularly to methods and apparatuses for compensating for multipath in GNSS navigation systems.

BACKGROUND OF THE INVENTION

With the development of radio and space technologies, several satellite-based navigation systems (i.e. satellite positioning system or "SPS") have already been built and more will be in use in the near future. Those systems with full global coverage are sometimes referred to as Global Navigation Satellite Systems ("GNSS"). SPS receivers, such as, for example, receivers using the Global Positioning System ("GPS"), also known as NAVSTAR, have become commonplace. Other examples of SPS and/or GNSS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS"), any future Western European SPS such as the proposed "Galileo" program, or any other existing or future system such as the Chinese "Beidou" or "Compass" system. As an example, the U.S. NAVSTAR GPS system is described in GPS Theory and Practice, Fifth ed., revised edition by Hofmann-Wellenhof, Lichtenegger and Collins, Springer-Verlag Wien NewYork, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

In environments where satellite signals are degraded, however, a GPS receiver often encounters problems in locking onto the signals that are needed for the calculation of position, velocity, altitude, and time. In a degraded signal environment, satellite signals can be weak or otherwise difficult for GPS receivers to lock on to. One example of a degraded signal environment is a tunnel through which a car equipped with a GPS receiver is driving. While the GPS receiver is in the tunnel, the satellite signals are completely obstructed and no lock can be acquired. As a result, the GPS receiver cannot accurately calculate its position and other navigational data (such as velocity, altitude, and time) while the car is in the tunnel. In addition, because GPS receivers typically utilize positioning algorithms that use navigational filters that account for the GPS receivers' last-known positions, the GPS receiver's position calculation when the car emerges from the tunnel can also be less accurate since accurate position calculations were not performed during the time that the car was in the tunnel.

Degraded signal environments are often encountered in urban areas, such as cities with many tall buildings. A city with many tall buildings can contain "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas. Other degraded environments include tunnels, garages, and inside buildings.

Moreover, in difficult signal environments like urban canyons, some direct GPS signals may be blocked by high buildings near the GPS receiver. The reflected signal is called multipath. The pseudoranges affected by the multipath will typically be a summation of the direct (true) pseudorange and some slowly varying biases since the multipath signals have to travel some extra time/distance.

In conventional receivers, the multipath problem is typically addressed by increasing measurement variance in the navigation filter to handle the multipath bias while leaving the bias in the solution. Although this allows the filter to keep operating, this leads to less accurate navigation solutions. Accordingly, a need remains for an effective method for handling multipath.

SUMMARY OF THE INVENTION

The present invention relates generally to methods and apparatuses for estimating and correcting for multipath in GNSS navigation systems. According to some aspects, the invention takes advantage of situations where position and estimated position error are reasonably stable so as to detect when large multipath errors are present with confidence. After detection, the slowly varying biases from multipath or other un-modeled sources can be modeled separately from the navigation state. This makes it possible to keep the measurements in the solution without biasing the navigation state and further ignores the long-term biases for use over short-term periods with minimized pseudorange error when necessary.

In accordance with these and other aspects, a method implemented by a receiver according to embodiments of the invention includes measuring, at the receiver, a signal from a satellite to obtain a pseudorange measurement; determining a multipath bias associated with the signal from a multipath model; removing the determined multipath bias from the pseudorange measurement; and updating a navigation state of the receiver using the pseudorange measurement with the multipath bias removed.

In additional accordance with these and other aspects, a method implemented by a receiver according to embodiments of the invention includes maintaining a navigation state of the receiver using a plurality of satellite signals; determining if sufficient multipath conditions exist in one or more of the satellite signals; and maintaining a model of the multipath in the one or more satellite signals so as to remove effects of the multipath in the maintained navigation state based on the determination.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
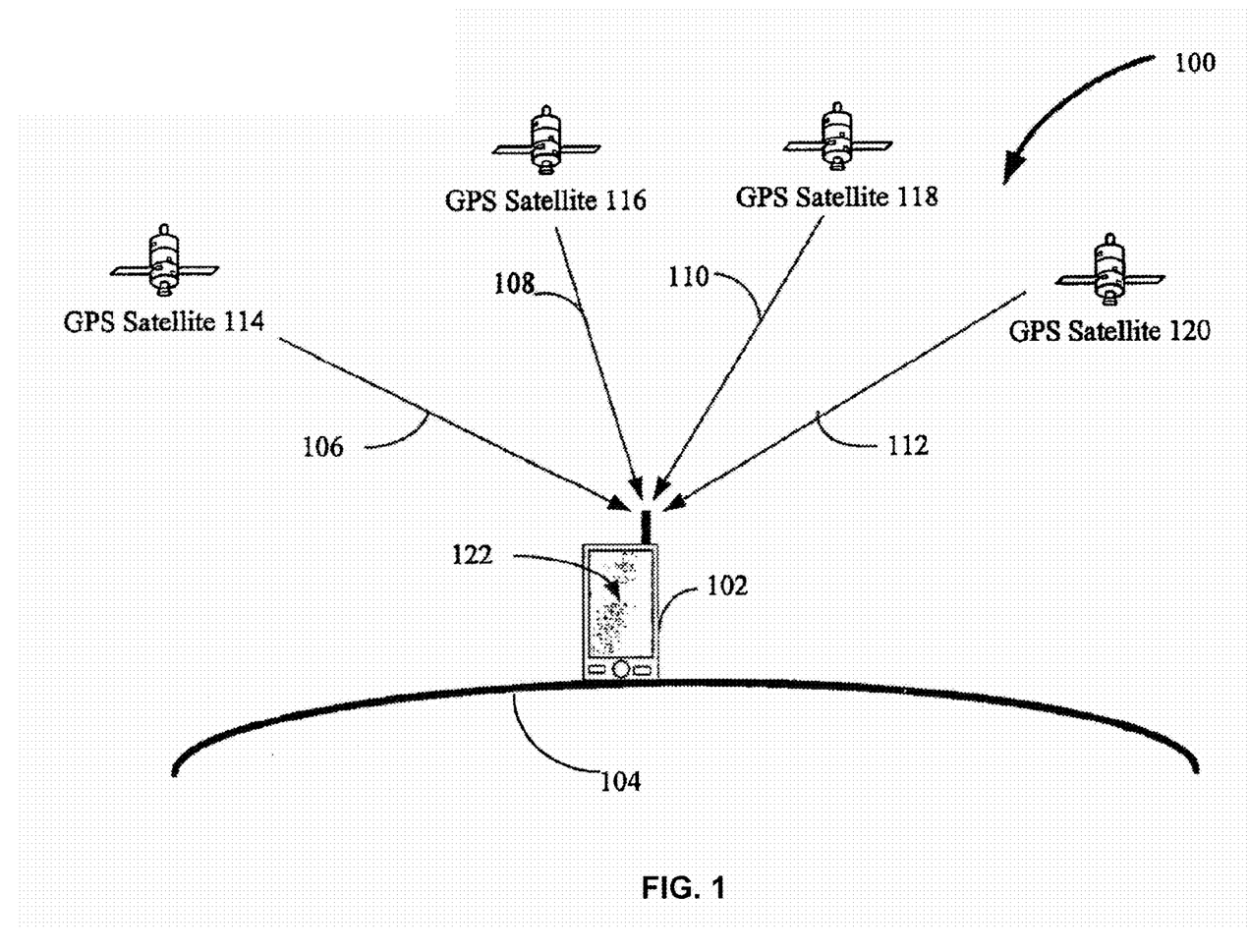
FIG. 1 is a block diagram illustrating an example implementation of embodiments of the invention.

FIG. 1 illustrates an example implementation of embodiments of the invention. As shown in FIG. 1, an example GNSS system 100 includes GPS satellites (i.e. SVs) 114, 116, 118 and 120 that broadcast signals 106, 108, 110 and 112, respectively, that are received by receiver 122 in handset 102, which is located at a user position somewhere relatively near the surface 104 of earth.

Handset 102 can be a cellular or other type of telephone with built-in GPS functionality (e.g. iPhone, Blackberry, Android smartphone, etc.), or it can be a notebook or tablet computer (e.g. iPad, etc.) with similar built-in positioning functionality, or it can be a personal navigation device (PND, e.g. from Garmin, TomTom, etc.) or any GPS device embedded in tracking applications (e.g. automotive tracking from Trimble, package or fleet management tracking from FedEx, child locator tracking applications etc.).

Receiver 122 can be implemented using any combination of hardware and/or software, including GPS chipsets such as SiRFstarIII GSD3tw, SiRFstar IV GSD4t or SiRFstar V from SiRF Technology and BCM4750 from Broadcom Corp., as adapted and/or supplemented with the multipath estimation and correction functionality in accordance with the present invention, and described in more detail herein. More particularly, those skilled in the art will be able to understand how to implement the present invention by adapting and/or supplementing such chipsets and/or software with the multipath estimation and correction techniques of the present invention after being taught by the present specification.

Although not shown in detail in FIG. 1, device 102 can include an IMU (Inertial Measurement Unit) comprising an accelerometer and/or a gyroscope and associated functionality for performing inertial navigation (i.e. dead reckoning) using signals from these sensors. In embodiments, there are three orthogonal accelerometers and three orthogonal gyroscopes. These can be implemented in a number of conventional or proprietary ways, including conventional MEMS devices.

Figure 2:
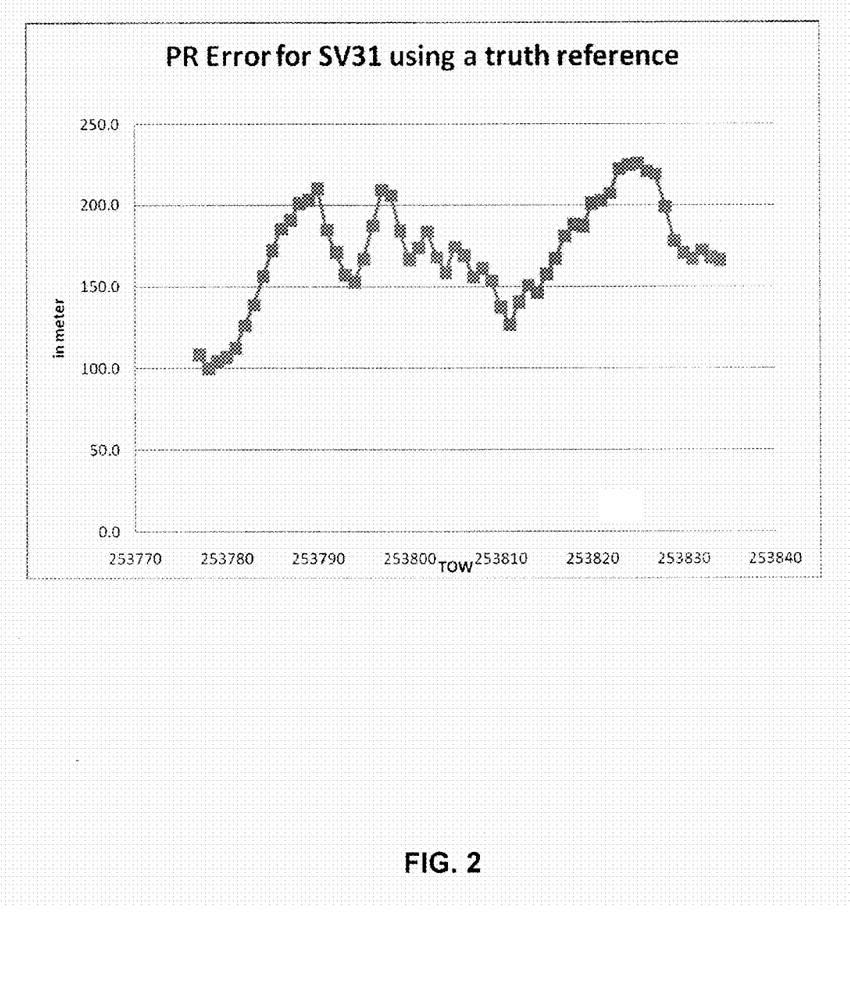
FIG. 2 is a graph illustrating actual pseudorange errors for an SV due to multipath.

The present inventors recognize that in difficult signal environments like urban canyons, some direct GPS signals may be blocked by high buildings near the GPS receiver. The reflected signal is called multipath. The pseudoranges affected by the multipath will typically be summation of the direct (true) pseudorange and some slowly varying biases since the multipath signals have to travel some extra time/distance. For example, FIG. 2 is a plot that shows the actual pseudorange errors for SV31 using a truth reference from an inertial measurement unit (IMU). It shows a slowly varying positive pseudorange bias between around 100 m to 220 m, which is due to multipath.

According to some general aspects, therefore, the present invention provides a method to estimate and correct the slowly varying biases on the pseudorange measurements due to the multipath effect or any other slowly varying unmodeled errors (e.g. atmospheric errors) and therefore to significantly improve the GPS navigation performance.

An example method for multipath estimation and correction according to the invention will now be described in connection with the flowchart in FIG. 3.

Figure 3:
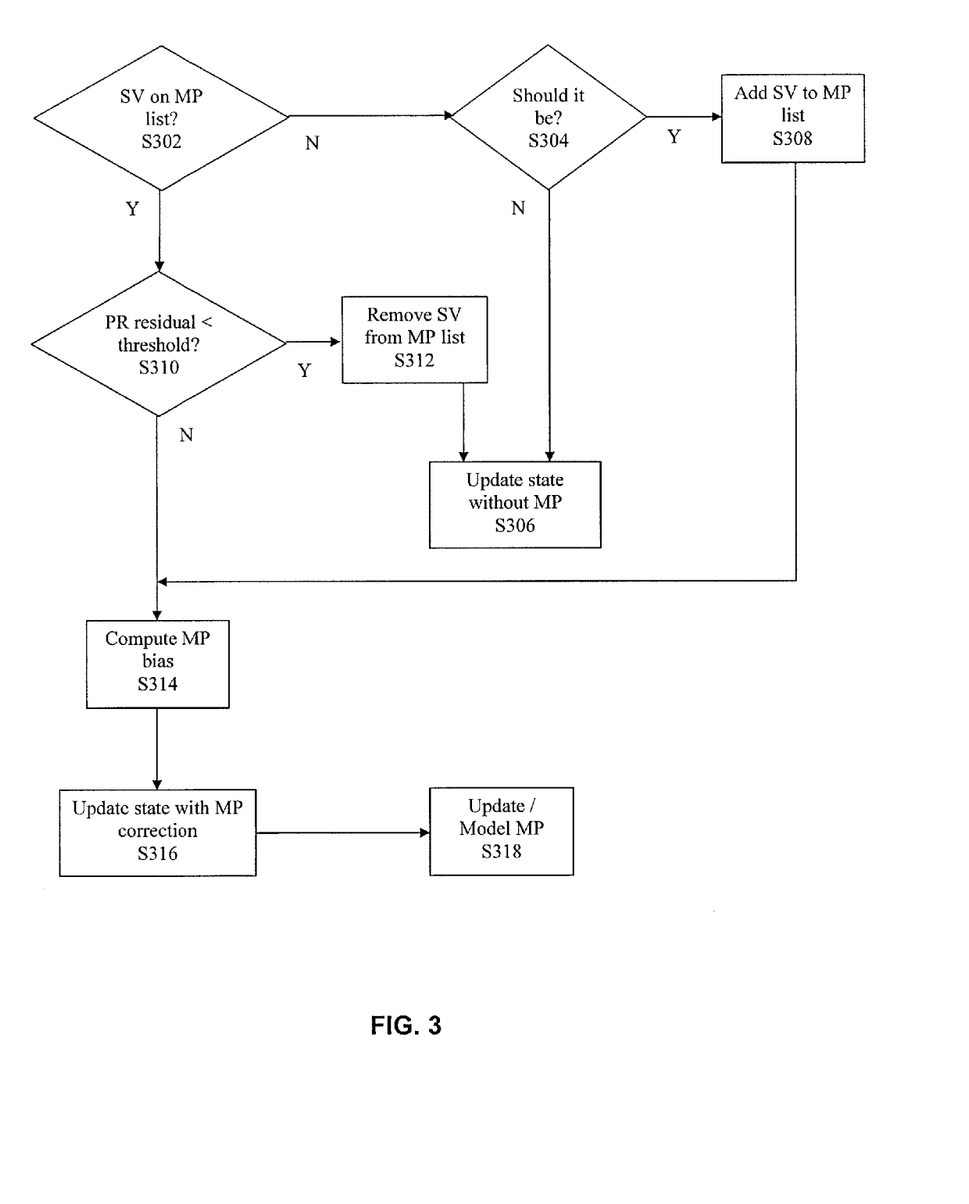
FIG. 3 is a flowchart illustrating an example overall multipath compensation method according to embodiments of the invention.

In embodiments such as that shown in FIG. 3, the method continuously examines the SV's that are currently being tracked and which are being used for updating a receiver state (e.g. PVT model or Kalman filter). For example, each time a new set of pseudorange measurements is computed, the multipath estimates are updated. Accordingly, for each SV, in a first step S302 it is determined if the SV is on the MP list. If not, then processing is performed to check if it should be added to the list in step S304. If it should not be added to the list, in step S306 the pseudorange for the SV is processed as a regular measurement without MP correction. Otherwise, if step S304 determines that the SV should be added to the MP list, in step S308 the SV is added to the MP list, and processing for this SV advances to S314.

Returning back to step S302, if the SV is already on the MP list, step S310 determines if the current PR residual is less than MP threshold. Further details of how this step can be performed are described in more detail below. If the PR residual is below the MP threshold, in step S312 the SV is removed from the MP list in and in step S306 pseudorange for the SV is processed without MP correction. Otherwise, if step S310 determines that the PR residual remains greater than the MP threshold, in step S314 a predicted MP bias is computed, as will be described in more detail below. Next, in step S316 the PR measurement with MP correction is applied, and a nav state update is completed using this corrected PR measurement, as can be done with conventional nav state processing. It should be noted, however, that this is an improvement on conventional techniques of handling MP, which for example handle MP by increasing the error variance in the nav state model while leaving MP in the nav state model. In step S318, the MP states are updated after the nav states are updated, as will be described in more detail below.

In embodiments such as that above or in alternative embodiments, a MP list is maintained that includes the SV ID and MP estimates for all qualifying SVs. In some embodiments, if the list is full before adding a newly qualifying SV, the SVs with the smallest MP estimates in the list are overwritten, when the new estimate is larger than the smallest.

Figure 4:
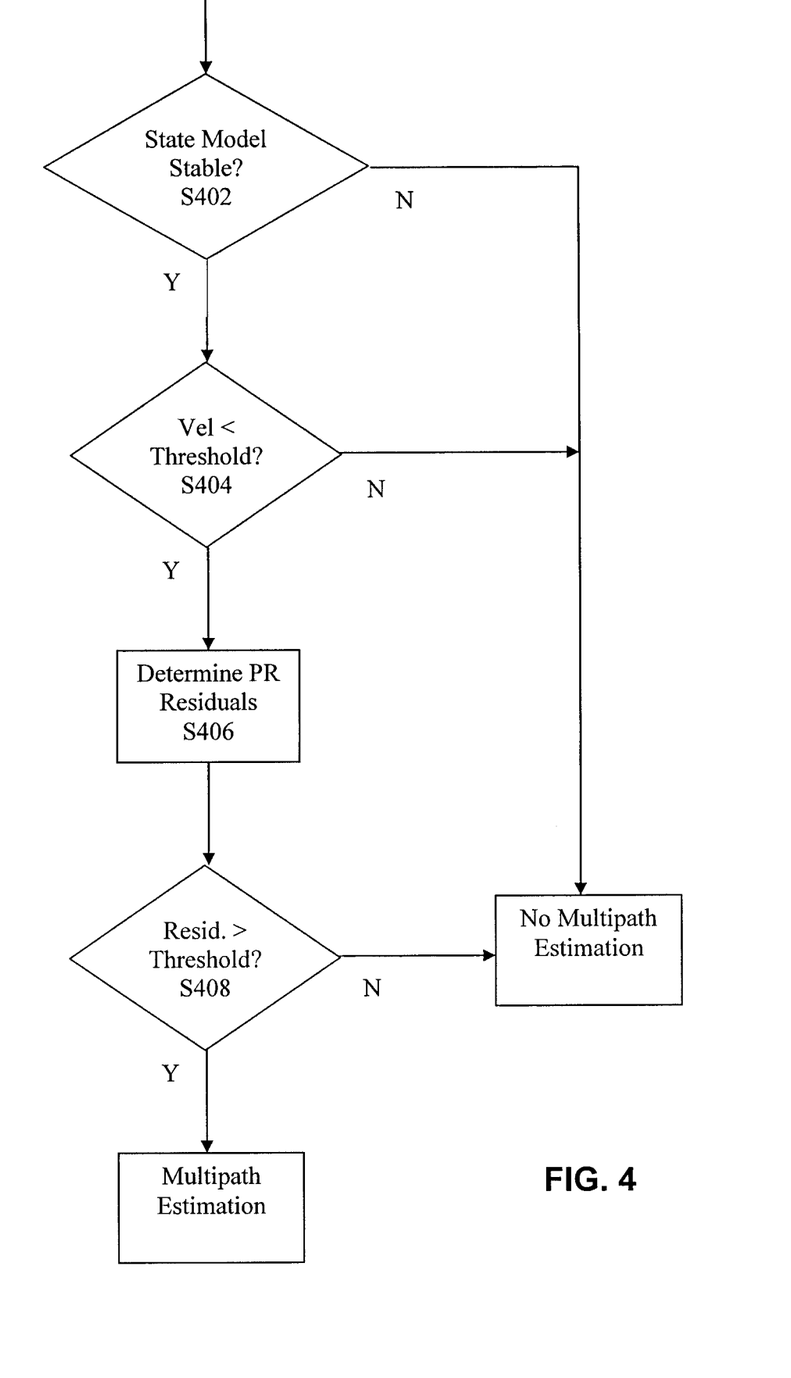
FIG. 4 is a flowchart illustrating an example method of determining the existence of multipath according to embodiments of the invention.

An example method of determining whether to determine whether to add a SV to an MP list, such as that performed in step S304 of FIG. 3, will now be described in more detail in connection with the flowchart in FIG. 4.

First, it is determined whether the state dynamic model for the receiver is stable enough to provide a reasonably accurate multipath estimate. In one example embodiment, a state dynamic model (e.g. a conventional PVT model or Kalman filter) includes 3-dimensional position, 3-dimensional velocity, clock bias and clock drift, as well as their associated variances. Accordingly, for example, in a first step S402, the current state dynamic model for the receiver is checked, and if the variance of the clock-bias estimate from the model is larger than a threshold, it is determined that MP cannot be estimated with sufficient accuracy. Without limitation, a clock-bias threshold in some example embodiments is about 300 $m^2$. Additionally or alternatively, step S402 can determine if the variance of the overall position state itself is larger than a threshold. Without limitation, a variance threshold in some example embodiments is a position variance of less than 400 $m^2$.

If the state dynamic model is stable, processing continues to a next step S404, where it is determined whether the velocity of the receiver is less than a threshold, for example and without limitation 20 meters/sec. This step need not be included in all embodiments, but is preferred in some embodiments because when velocity is too high, multipath estimates become difficult to determine due to the changes in conditions. More particularly, since multipath biases are typically caused by stationary reflectors (e.g. large buildings), when the rate of movement between the stationary reflector and the moving antenna is large, the multipath biases cannot be modeled reliably.

Next, in step S406 (which is also an example of how step S310 can be performed), a pseudorange (PR) residual for the SV's determined using any known approach. For example, the difference between the estimated pseudorange and the measured pseudorange from the receiver. The estimated pseudorange is determined using the current position of the receiver from the state dynamic model and SV ephemeris information. In this embodiment any signal may be considered for multipath delay.

In step S408, it is determined whether the PR residual (i.e. measured PR minus the estimated PR from above) for the SV is larger than a threshold. It is noted here that the calculated PR residual must be positive in order to be determined to be multipath. In example embodiments, the threshold for beginning MP modeling and correction is when PR residual exceeds 30 meters. The multipath threshold is a function of the position state uncertainty. So, if the position state uncertainty is too large, we can't reliably estimate the multipath error.

The present inventors recognize that one must be careful to not transfer position state error into estimated multipath error. According to aspects of the invention, therefore, step S408 also preferably includes several additional checks to ensure the position state uncertainty is reliable. For example, this embodiment checks how many pseduorange residuals projected into the vertical domain based on the elevation of the satellite are beyond a threshold (for example 25 m in this embodiment). Additionally, a Chi-squares test can be performed on the residuals to make sure that the pseudorange measurements are conforming to an error model (with multipath removed from the residuals).

It should be noted that the thresholds described above in connection with receiver velocity, pseudorange, etc. are non-limiting examples. Moreover, these thresholds need not be fixed, but may be varied in certain situations or environments. Accordingly, the invention is not limited to the above fixed thresholds, but various alternatives are possible.

An example method of obtaining an MP bias from a model, such as the model used and updated in steps S314 and S318 in FIG. 3, will now be described in more detail below.

In embodiments such as that shown in FIG. 3, if no current MP model exists, in step S314 the initial estimate of the multipath bias is set to the pseudorange residual. The initial standard deviation of the multipath estimate is set to the half of the pseudorange residual. Otherwise, in step S314 the multipath bias is obtained from a MP model. An example methodology for developing and/or updating a MP model according to the embodiments of the invention is now described.

In embodiments, the state dynamic model for a SV without multipath correction is given as:

$$X(k+1)=F(k)X(k)+v(k),$$

where X(k) is the state vector which may include receiver position, velocity, clock bias and clock drift. The position and velocity elements can be in any coordinate system, such as Earth-Centered-Earth-Fixed (ECEF) or North-East-Down (NED). F(k) is the known state transition matrix, and v(k) is the process noise with covariance Q(k).

In embodiments, when MP is determined to exist, in addition to an existing filter that is maintained and used to estimate the state vector (i.e. to maintain and update the state transition matrix F(k)), a separate filter is maintained to estimate the multipath state simultaneously. In this case, the combined state vector will be determined using the separately maintained state vector X given above and the newly determined multipath state vector Mp.

To develop a dynamic model of multipath, the present inventors first recognize that the PR measurements for a SV are typically some non-linear functions of the state vector X(k) with the slowly varying biases due primarily to multipath and some additional zero-mean measurement noises. For simplicity, however, after linearization, the measurement equation can be given as:

$$Z(k)=H(k)X(k)+Mp(k)+w(k)$$

where Z(k) is the measurement vector, H(k) is the dynamic measurement model, w(k) is the zero-mean measurement noise with covariance R(k), and Mp(k) is the multipath state vector. In embodiments, the multipath state vector includes the multipath bias (i.e. pseudorange residual) and bias rate.

The multipath vector Mp(k)=0 when there is no multipath. Accordingly, using the known values of the measurement vector Z and receiver state X, the dynamic measurement model H(k) can be determined along with the receiver state before multipath is determined.

After multipath has been determined a new model for it can be initiated. Its own state dynamic model is given by:

$$Mp(k+1)=Fp(k)Mp(k)+vp(k)$$

Where Fp(k) is the state transition matrix for multipath and vp(k) is the combined state variance. In embodiments, the combined state variance will include the state variance, the multipath state variance, and the cross-covariance between the state and the multipath estimate.

Combining the prediction for both state and multipath gives:

$$\begin{bmatrix} X(k+1|k) \\ M_p(k+1|k) \end{bmatrix} = \begin{bmatrix} F(k) & 0 \\ 0 & F_p(k) \end{bmatrix} \cdot \begin{bmatrix} X(k|k) \\ M_p(k|k) \end{bmatrix}$$

The combined receiver state and multipath variance prediction is:

$$\begin{bmatrix} P(k+1|k) & P_x(k+1|k) \\ P_x(k+1|k)^T & P_p(k+1|k) \end{bmatrix} =$$
$$\begin{bmatrix} F(k) & 0 \\ 0 & F_p(k) \end{bmatrix} \begin{bmatrix} P(k|k) & P_x(k|k) \\ P_x(k|k)^T & P_p(k|k) \end{bmatrix} \begin{bmatrix} F(k) & 0 \\ 0 & F_p(k) \end{bmatrix}^T + \begin{bmatrix} Q(k) & 0 \\ 0 & Q_p(k) \end{bmatrix}$$

Where P is a variance of the navigation state, Px is a co-variance between navigation state and multipath state, and Pp is a variance of the multipath state, and Qp is the covariance matrix for multipath.

Re-writing the above measurement equation, the pseudorange residual $\mu$ state due to multipath corrected is given by:

$$\mu(k+1) = Z(k+1) - H(k+1)X(k+1|k) - Mp(k+1|k)$$

The innovation variance S is given by:

$$S(k+1) = H*P(k+1|k)*H^T + P_x(k+1|k)^T*H^T + H*P_x(k+1|k) + P_p(k+1|k) + R(k+1)$$

Where R is a known measurement variance coming from a predetermined measurement variance model. So, collecting terms from the above equation gives the gain W, which is expressed by:

$$W(k+1) = \begin{bmatrix} P(k+1|k) & P_x(k+1|k) \\ P_x(k+1|k)^T & P_p(k+1|k) \end{bmatrix} \begin{bmatrix} H(k+1)^T \\ I \end{bmatrix} S(k+1)^{-1}$$

Expressing the updated state and multipath estimates using the above terms for the residual and gain from the measurements gives:

$$\begin{bmatrix} X(k+1|k+1) \\ M_p(k+1|k+1) \end{bmatrix} = \begin{bmatrix} X(k+1|k) \\ M_p(k+1|k) \end{bmatrix} + W(k+1)\mu(k+1)$$

Similarly, the updated covariance is given by:

$$\begin{bmatrix} P(k+1|k+1) & P_x(k+1|k+1) \\ P_x(k+1|k+1)^T & P_p(k+1|k+1) \end{bmatrix} =$$
$$\begin{bmatrix} P(k+1|k) & P_x(k+1|k) \\ P_x(k+1|k)^T & P_p(k+1|k) \end{bmatrix} - W(k+1)S(k+1)W(k+1)^T$$

One may consider a special case where the cross-covariance Px(.) between the state and multipath estimates is zero. Two filters can then be used to improve the computational efficiency, one for the state vector X(.) and the other for multipath state Mp(.). This method can be described as follows.

The receiver state filter uses the current multipath estimate and its variance to update the receiver state. The receiver state prediction and its variance are, $$X(k+1|k) = F(k)*X(k|k) \text{ and}$$

$$P(k+1|k) = F(k)*P(k|k) + Q(k)$$

The prediction for the multipath and its variance are, $$Mp(k+1|k) = Mp(k|k)$$

$$P_p(k+1|k) = Pp(k|k) + Qp(k)$$

The residual is $$\mu(k+1) = Z(k+1) - H(k+1)*X(k+1|k) - Mp(k+1|k)$$

The innovations variance is given by $$S(k+1) = H(k+1)*P(k+1|k)*H(k+1)T + Pp(k|k) + Qp(k) + R(k)$$

The state and variance updates are $$X(k+1|k+1) = X(k+1|k) + P(k+1|k)*H(k+1)^T*S(k+1) - 1*\mu(k+1)$$

$$P(k+1|k+1) = P(k+1|k) - P(k+1|k)*H(k+1)^T*S(k+1) - 1*H(k+1)*P(k+1|k).$$

Thus for an example multipath filter according to embodiments of the invention, the updated estimates and variance are $$Mp(k+1|k+1) = Mp(k+1|k) + Pp(k+1|k)*S(k+1)^{-1}*\mu(k+1);$$

$$Pp(k+1|k+1) = Pp(k+1|k) - Pp(k+1|k)*S(k+1)^{-1}*Pp(k+1|k)$$

In additional or alternative embodiments, if a satellite is already on the MP list, the elevation of this SV is high and the signal is strong, the MP estimate can be reduced using a linear decreasing model:

$$MP(k) = MP(k-1) - MP\_rate + noise$$

Instead of the normal equation of MP(k)=MP(k−1)+noise

Figure 5:
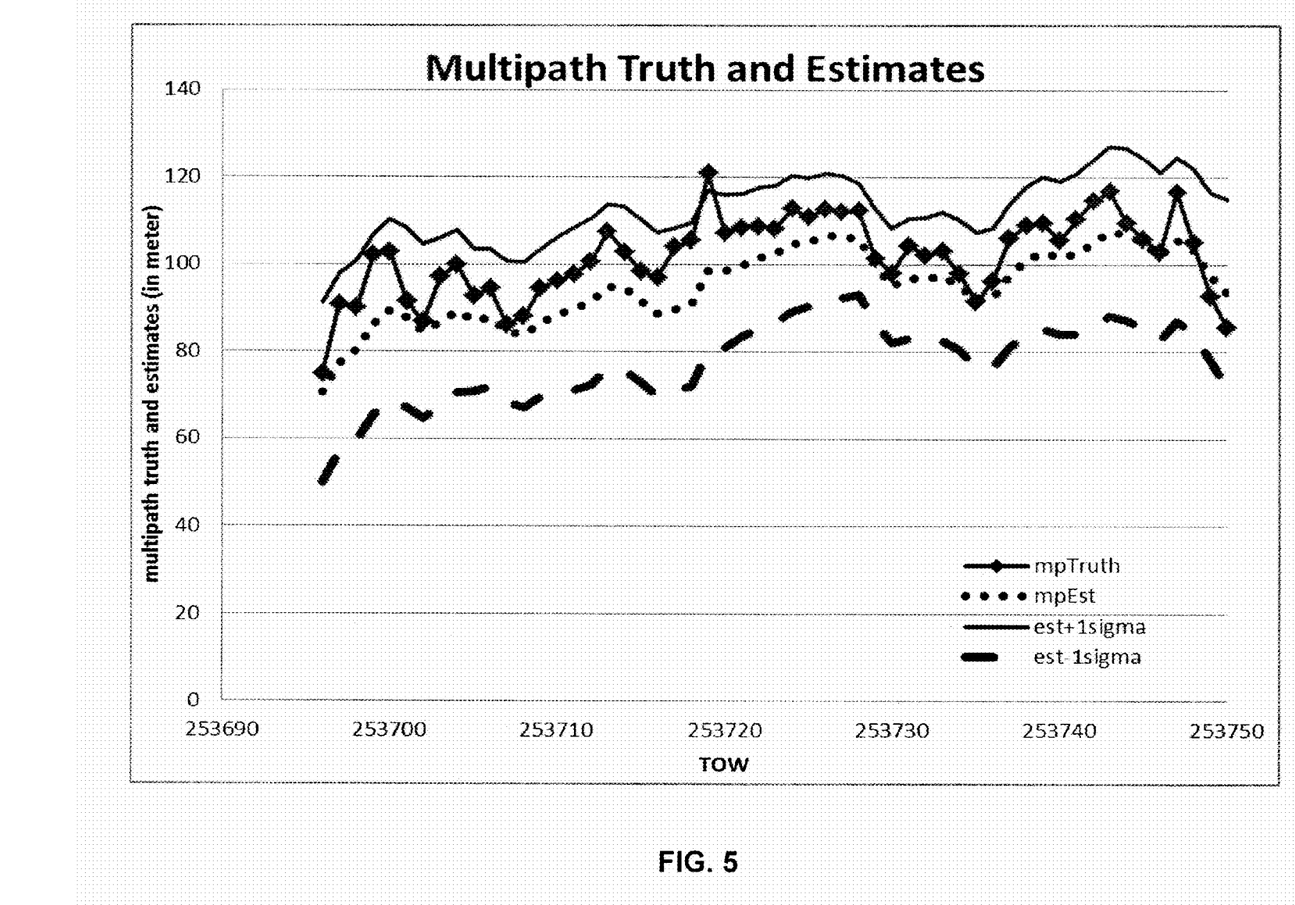
FIG. 5 is a diagram illustrating experimental results according to implementations of embodiments of the invention.

FIG. 5 is a plot illustrating one example implementation of the multipath estimation and correction algorithm according to embodiments of the invention. In this example, the state dynamic estimation is using a constant-velocity model; For the multipath state estimation, Fp(k)=1, Qp(.)=15 m*15 m.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method implemented by a receiver, comprising:
   measuring, at the receiver, a signal from a satellite to obtain a pseudorange measurement;
   determining whether a velocity of the receiver is less than a first threshold;
   computing a pseudorange residual using the obtained pseudorange measurement in response to determining that the velocity of the receiver is less than the first threshold;
   comparing the pseudorange residual to a second threshold to determine whether the pseudorange residual is less than a second threshold;
   determining a pseudorange bias associated with the signal from a pseudorange bias model in response to determining that the pseudorange residual is not less than the second threshold;

removing the determined pseudorange bias from the pseudorange measurement;

updating a navigation state of the receiver using the pseudorange measurement, wherein the navigation state of the receiver is updated using the pseudorange measurement with the pseudorange bias removed in response to determining that the pseudorange residual is not less than the second threshold, and the navigation state of the receiver is updated using the pseudorange measurement without the pseudorange bias removed in response to determining that at least one of the pseudorange residual is less than the second threshold and the velocity of the receiver is not less than the first threshold.

2. A method according to claim 1, wherein the receiver is a Global Navigation Satellite System (GNSS) receiver.

3. A method according to claim 1, wherein the pseudorange bias is due to a slowly varying condition.

4. A method according to claim 3, wherein the slowly varying condition is multipath.

5. A method according to claim 1, wherein computing the pseudorange residual includes determining an estimated pseudorange using ephemeris information for the satellite.

6. A receiver device comprising:

a GPS chipset; and a processor configured with processor executable instructions to:

measure a signal from a satellite to obtain a pseudorange measurement;

determine whether a velocity of the receiver device is less than a first threshold;

compute a pseudorange residual using the obtained pseudorange measurement in response to determining that the velocity of the receiver device is less than the first threshold;

compare the pseudorange residual to a second threshold to determine whether the pseudorange residual is less than a second threshold;

determine a pseudorange bias associated with the signal from a pseudorange bias model in response to determining that the pseudorange residual is not less than the second threshold;

remove the determined pseudorange bias from the pseudorange measurement;

update a navigation state of the receiver device using the pseudorange measurement, wherein the navigation state of the receiver device is updated using the pseudorange measurement with the pseudorange bias removed in response to determining that the pseudorange residual is not less than the second threshold, and the navigation state of the receiver device is updated using the pseudorange measurement without the pseudorange bias removed in response to determining that at least one of the pseudorange residual is less than the second threshold and the velocity of the receiver is not less than the first threshold.

7. A receiver device according to claim 6, wherein the receiver device is a Global Navigation Satellite System (GNSS) receiver.

8. A receiver device according to claim 6, wherein the pseudorange bias is due to a slowly varying condition.

9. A receiver device according to claim 8, wherein the slowly varying condition is multipath.

10. A receiver device according to claim 6, wherein the processor is further configured with processor executable instructions such that computing the pseudorange residual is performed by determining an estimated pseudorange using ephemeris information for the satellite.

* * * * *